United States Patent
Schertz et al.

(10) Patent No.: US 7,802,956 B2
(45) Date of Patent: Sep. 28, 2010

(54) APPARATUS FOR AUTOMATICALLY UNLOADING AGRICULTURAL MATERIAL FROM A STORAGE BAG

(76) Inventors: Scott F. Schertz, 2501 County Rd. 270, Winona, KS (US) 67747; Glen Kemp, P.O. Box 281, Winona, KS (US) 67764

( * ) Notice: Subject to any disclaimer, the term of this patent is extended or adjusted under 35 U.S.C. 154(b) by 719 days.

(21) Appl. No.: 11/752,055

(22) Filed: May 22, 2007

(65) Prior Publication Data

US 2008/0290199 A1    Nov. 27, 2008

(51) Int. Cl.
 *B65B 21/02*    (2006.01)
(52) U.S. Cl. .................... 414/403; 414/411; 414/296; 414/307
(58) Field of Classification Search .............. 414/403, 414/411, 412, 501, 507, 488, 296, 307; 296/15
See application file for complete search history.

(56) References Cited

U.S. PATENT DOCUMENTS

| 3,985,305 | A | 10/1976 | Williamson et al. |
| 4,420,119 | A | 12/1983 | Johnson |
| 6,109,552 | A | 8/2000 | Strankman |
| 6,591,971 | B1 | 7/2003 | Sheahan |
| 7,085,777 | B2 * | 8/2006 | Beck et al. .................... 1/1 |
| 2004/0006957 | A1 * | 1/2004 | Sheidler et al. .......... 56/10.2 G |

* cited by examiner

*Primary Examiner*—Saúl J Rodriguez
*Assistant Examiner*—Willie Berry
(74) *Attorney, Agent, or Firm*—Invention Protection Associates, LLC (57) ABSTRACT

An unloading mechanism capable of automatically unloading agricultural materials from a storage bag is disclosed. The unloading mechanism includes a collection mechanism, discharge mechanism and a sensor arrangement configured to engage the storage bag. The sensor arrangement controls the unloading mechanism so that it automatically advances in a direction towards the storage bag as material is unloaded therefrom.

4 Claims, 6 Drawing Sheets

APPARATUS FOR AUTOMATICALLY UNLOADING AGRICULTURAL MATERIAL FROM A STORAGE BAG

BACKGROUND

The present invention relates to unloading mechanisms, and more particularly, to an unloading mechanism capable of automatically removing agricultural material from a storage bag.

Today, animal feed and other agricultural materials are often stored in elongated, tubular storage bags, rather than in traditional vertical silos and bunkers. Typically, these storage bags, because of their sizes, become considerably heavy and, therefore, virtually incapable of being lifted or otherwise moved when filled with agricultural materials. Therefore, bag contents must be removed from the bag, while it sits in its place, and deposited into a carrier capable of hauling the material to a destination at which the material is needed. As a consequence, bag-unloading machines of various constructs have been developed in the prior art. These machines typically have a frame assembly that features a mechanism(s) for engaging material inside a bag and removing it therefrom while the machine advances along the length of the stationary bag. Examples of such machines are disclosed in U.S. Pat. No. 6,109,552 to Strankman and U.S. Pat. No. 4,420,119 to Johnson.

Of course, all agricultural storage bags are not identical, and neither are all agricultural materials that these bags are used to hold. Consequently, the rate at which an unloading machine should travel down the length of a particular bag, as its material collection mechanism is engaging material therewithin and removing it therefrom, is dependent upon the rate at which the bag is actually being emptied. However, the bag emptying rate may vary, as it is dependent upon factors such as: the granularity of the agricultural material, the diameter of the storage bag and the collection and removal capacity of the machine's collection mechanism. Accordingly, while machines adapted specifically for unloading heavy agricultural storage bags are well-known in the prior art, the drive mechanisms that propel their frame assemblies along the length of a storage bag may require manual start and stop control during unloading operations, or they may need adjustment, from bag to bag, prior to operating at predetermined travel speeds.

Therefore, it can be appreciated that there remains a need for a bag unloading mechanism that is capable of sensing the rate at which material is being removed from a bag and then automatically advancing its frame assembly along the length of the bag and, therefore, its material collection mechanism further into the bag in a manner commensurate with that rate of material removal, so as to neither advance too slowly and, thereby, operate inefficiently nor advance too quickly and, thereby, overload and possibly jam the collection mechanism with material. The automatic unloading apparatus of the present invention substantially fulfills this outstanding need.

SUMMARY

It is an object of the present invention to provide an apparatus for automatically unloading agricultural material from a storage bag.

In one aspect of the invention, the apparatus comprises a drive mechanism as well as frame assembly having a collection mechanism in operation with a discharge mechanism. The collection mechanism component of the frame assembly is configured to remove material from a bag as the frame assembly advances along the direction of the bag towards its closed end. The collection mechanism comprises a collection auger disposed within the bag. It also comprises a conveyor in operation with the collection auger. The conveyor collects material from the auger and delivers the material to a temporary collection receptacle. The discharge mechanism component is configured to then remove the material from the collection mechanism and deposit it into a storage receptacle. The discharge mechanism comprises a discharge auger having a first end positioned at the temporary collection receptacle and a second end positioned at a storage receptacle. The discharge auger removes the material from the collection receptacle and delivers the material to the storage receptacle. The drive mechanism is attached to the frame assembly, and it is capable of advancing the frame assembly along the direction of the storage bag.

In another aspect of the invention, the apparatus further comprises a sensor coupled to the collection mechanism. The sensor is configured to determine the current amount of material being removed from the storage bag. Based upon that determination, the sensor can activate the drive mechanism, causing it to automatically advance the frame assembly along the direction of the storage bag. The sensor can subsequently deactivate the drive mechanism to stop that advancement.

DETAILED DESCRIPTION OF THE PREFERRED EMBODIMENTS

The present disclosure generally relates to an unloading apparatus, and it is specifically directed towards an apparatus for unloading agricultural material from a storage bag in an automatically controlled manner dictated by the momentary resistance provided by the bag or its unremoved contents.

As will become apparent from the discussion below in connection with the accompanying drawings, the present disclosure has particular applicability to mechanized unloaders used to automatically unload agricultural material from large storage bags. However, those having skill in the art should appreciate that the present disclosure has general applicability to situations where it is desirable to use a machine for unloading loose material from a bag.

Figure 1:
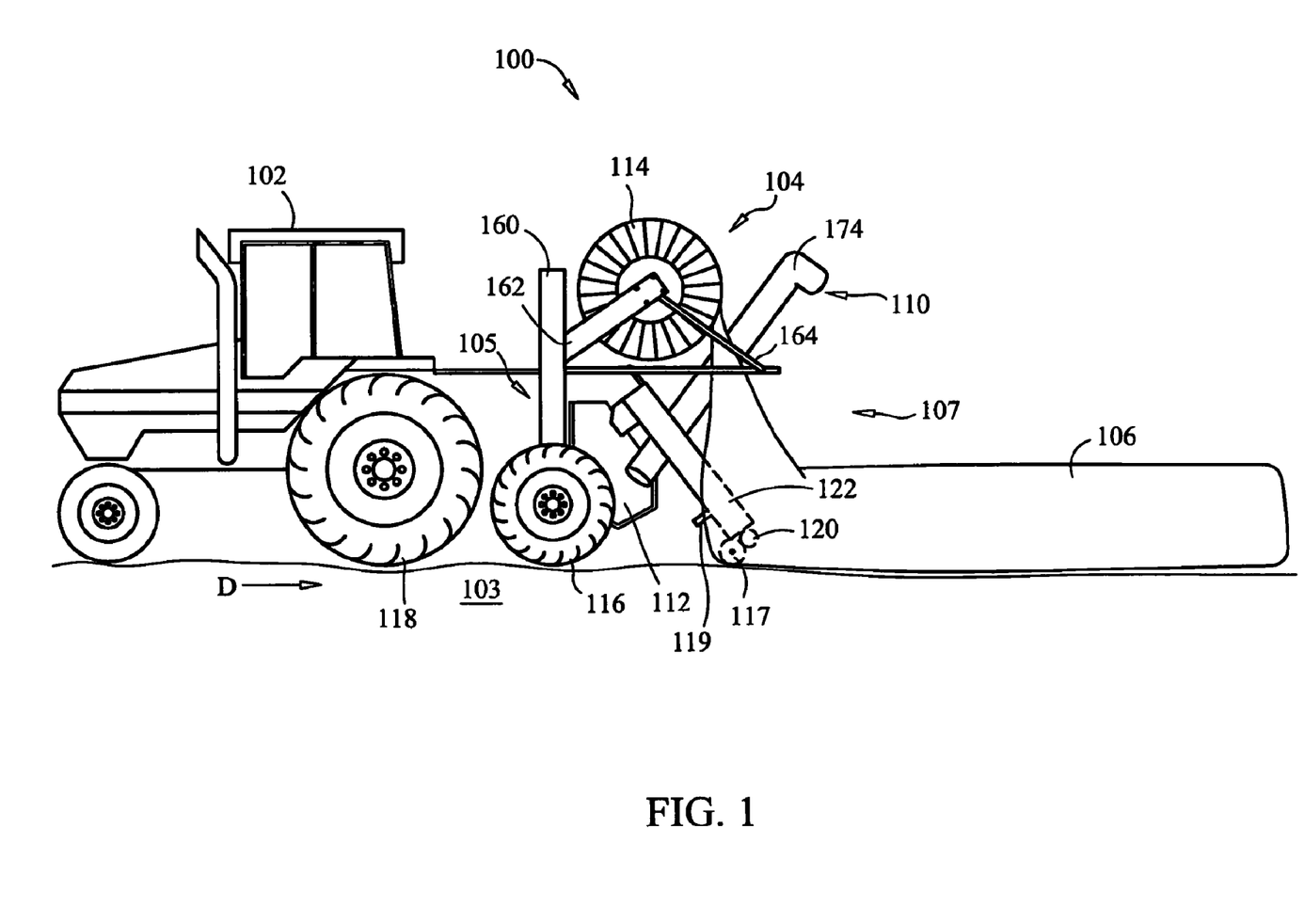
FIG. 1 is a left elevational view of an unloader for automatically unloading material from a storage bag in accordance with the present disclosure. In this view, the unloader is shown hitched to a tractor.

Referring now to FIG. 1, there is illustrated an unloader 100 operating to unload agricultural material (not shown) from a storage bag 106. In the described embodiment, the storage bag 106 is manufactured from a polymeric material, such as polyethylene, and is available in a variety of sizes based upon the user's storage requirements. Examples of storage bags for use in the present invention include the AT Plastics® AST™ Silage Bags manufactured by AT Plastics, Inc. of Alberta, Canada. An example of such commercially available storage bags has a diameter (width) of 9 ft. and a length of 300 ft. The agricultural material being unloaded from the bag 106 can be unthreshed grains or seeds (such as, corn, wheat, rice, grasses, etc.), silage or any other agricultural material capable of being stored in such a bag. However, it should be understood that the unloader 100 is not limited in its operation to unloading agricultural material. In fact, it could be operated to remove a variety of loose materials from a storage bag, such as sand, gravel or dirt.

As shown in FIG. 1, the unloader 100 comprises a frame assembly 104 that is operable with an external drive mechanism, such as a farm tractor 102 or other similar mechanism capable of propelling the frame assembly 104. The tractor 102 can be secured to the front end 105 of the frame assembly 104 in a fashion that enables the tractor 102 to push and pull the frame assembly 104. The tractor 102 includes an onboard hydraulic system (not shown) capable of powering the tractor's drive system. As will be discussed in greater detail below, the hydraulic system of the tractor 102 can also be used to supply power to the frame assembly 104. In this regard, the tractor 102 should be considered an external drive mechanism operable with the frame assembly 104. However, it will be appreciated by those skilled in the art that the frame assembly 104 can be equipped with an integrated, onboard hydraulic system, thereby, enabling the unloader 100 to move and operate independently without an external drive mechanism.

Figure 2:
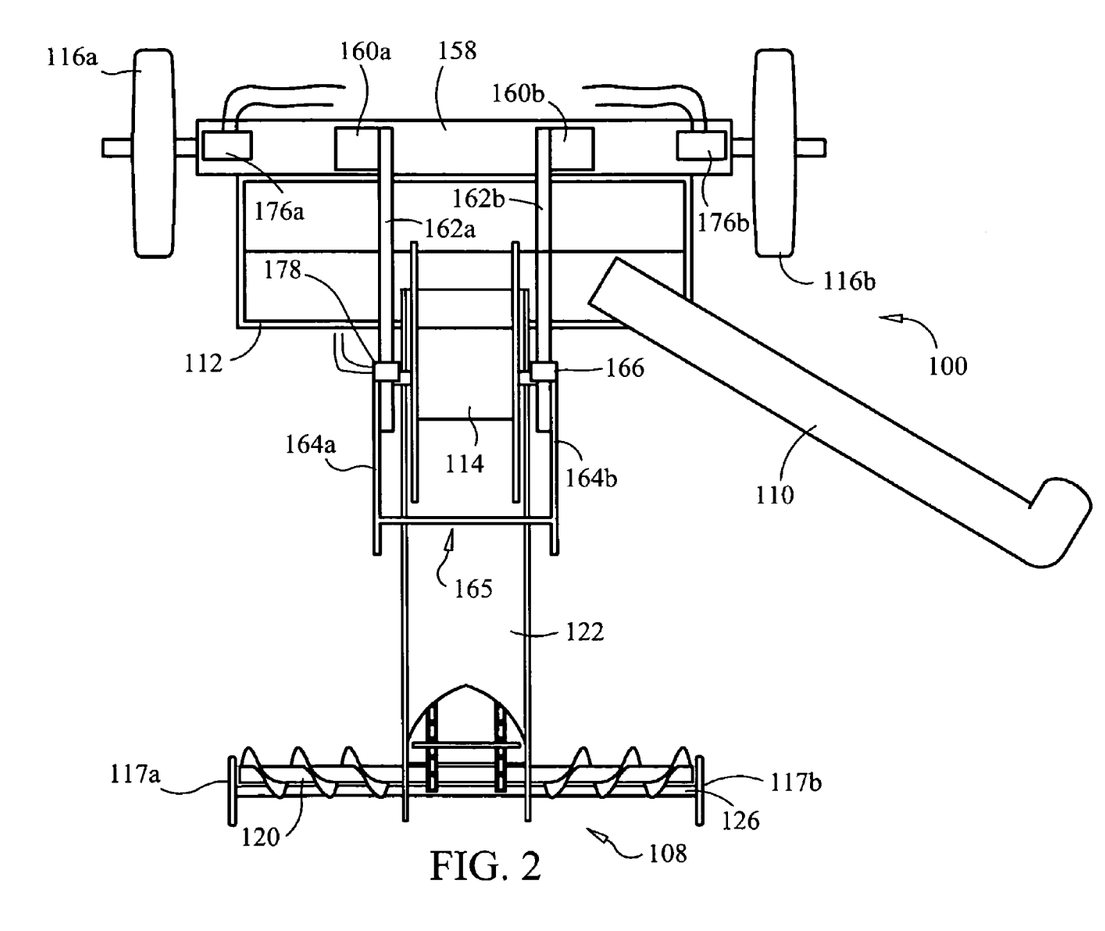
FIG. 2 is a top plan view of the unloader of FIG. 1.

Referring now to FIGS. 1 and 2, the frame assembly 104 includes a pair of drive wheels 116 situated at its front end 105. The drive wheels 116 are supported at the opposite ends of a lateral support member 158 of the frame assembly 104. A hydraulic motor powering the drive wheels 116 can form an internal drive mechanism. Alternatively, the drive wheels 116 can be independently powered and controlled by separate hydraulic motors. For example, FIG. 2 shows an embodiment of an internal drive mechanism in which both drive wheels 116a, 116b are provided with separate hydraulic motors 176a, 176b. Still alternatively and as mentioned above, in one possible embodiment of the disclosure, the hydraulic motors 176 are powered by an external power system, such as the onboard hydraulic system of the tractor 102. During operation, the drive wheels 116 and a rearward pair of support wheels 117 (discussed below) allow the frame assembly 104 to travel along a direction D substantially parallel to a lengthwise axis L (see FIG. 6) of the storage bag 104.

Figure 3:
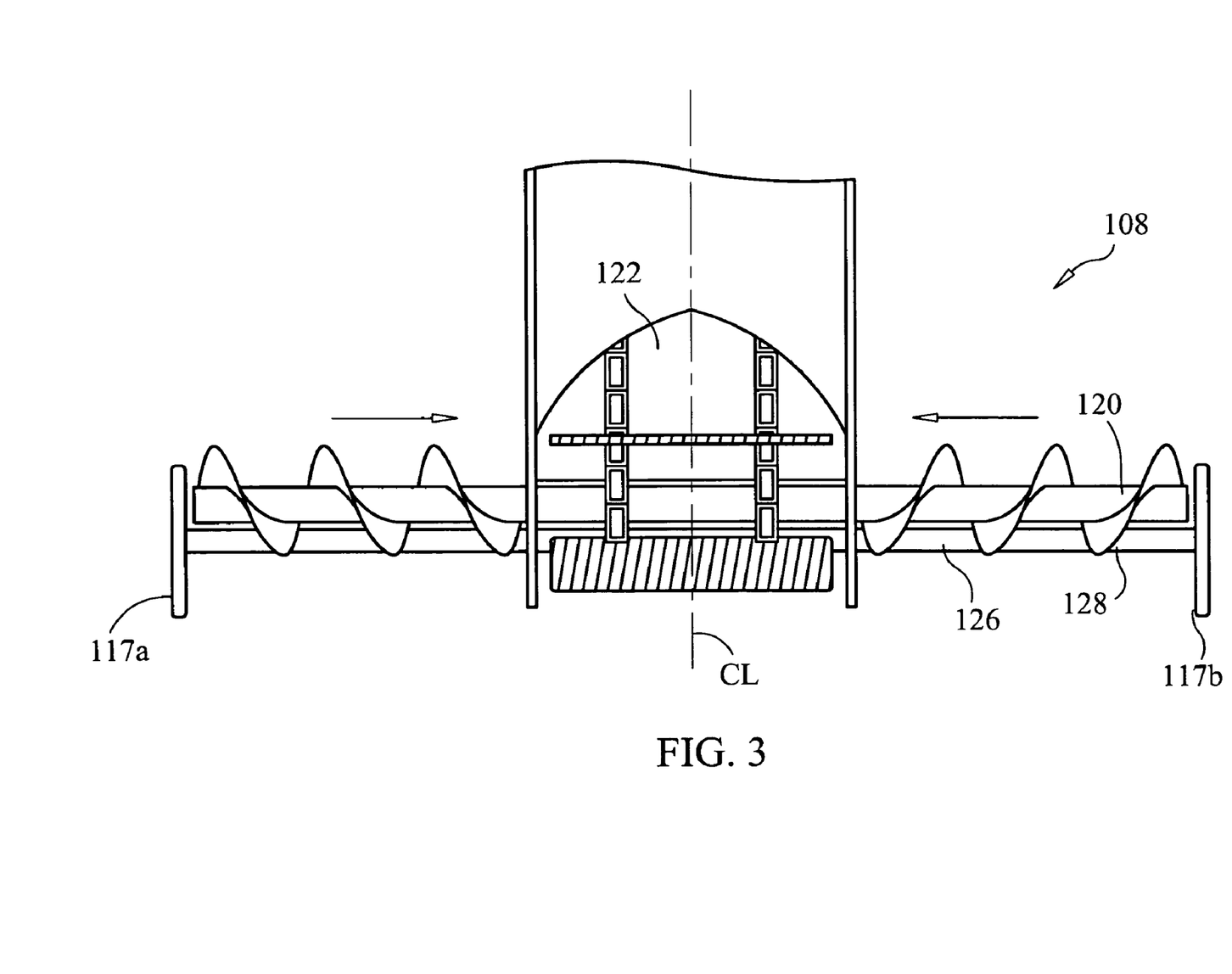
FIG. 3 is an exploded, top plan view of a rearward portion of a collection mechanism in accordance with the present disclosure.

The frame assembly 104 includes a collection mechanism 108 and a discharge mechanism 110. The collection mechanism 108—which is secured to the rest of the frame assembly 104 and is situated at its rear end 107—is for removing material from the storage bag 106. FIG. 3 is an exploded view of a rearward portion of the collection mechanism 108 of the preferred embodiment. As shown, the collection mechanism 108 comprises a laterally disposed auger 120 configured to engage material stored within the storage bag 106, a longitudinally disposed conveyor mechanism 122 configured to remove material from the bag 106 and a pair of support wheels 117a, 117b which are connected by an axle 126 that is secured to the conveyor mechanism 122. Preferably, the lateral distance between the two support wheels 117a and 117b can be adjusted to correspond, substantially, to the diameter of the particular storage bag 106 that the collection mechanism 108 is to be inserted within.

Figure 4:
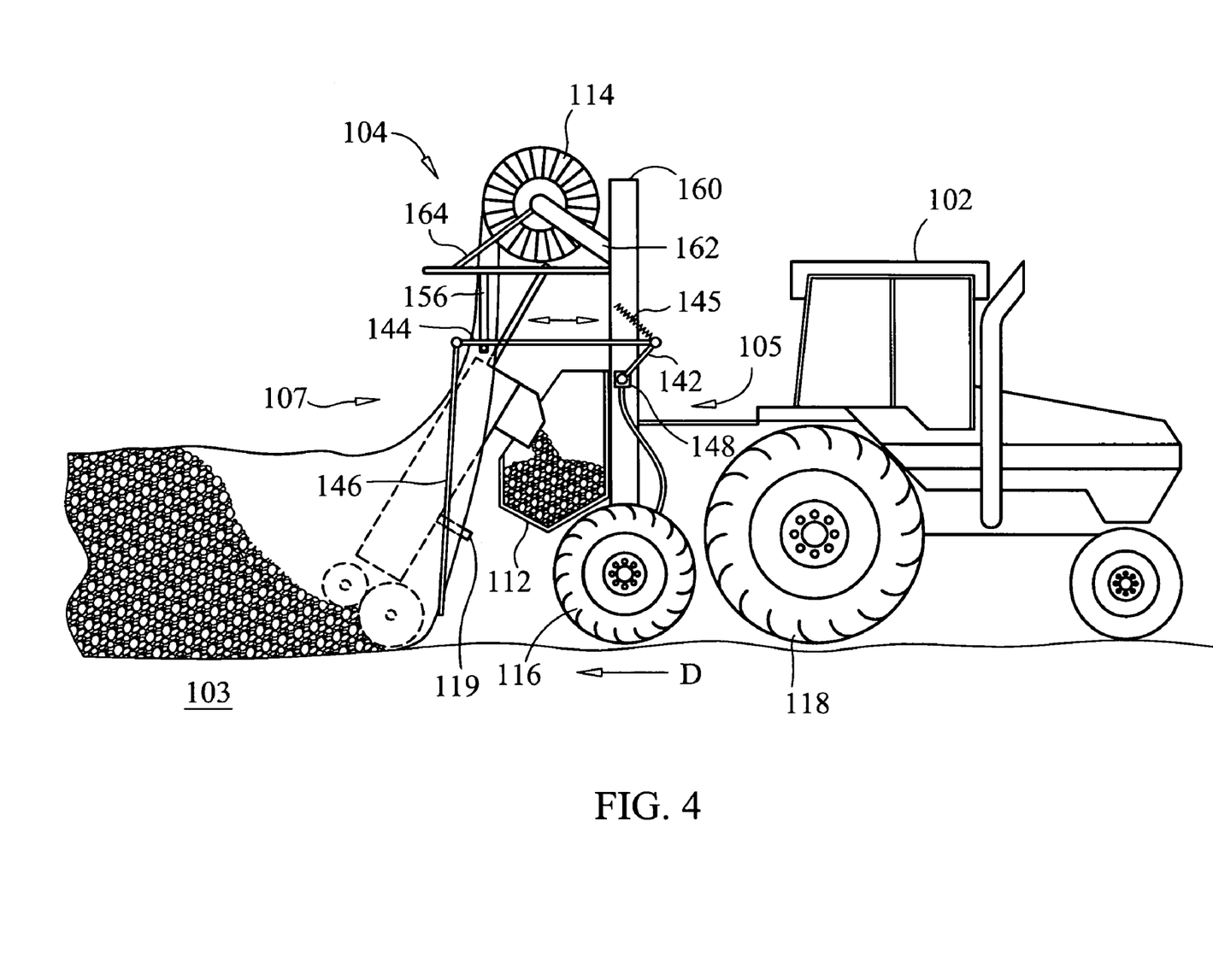
FIG. 4 is a fragmentary, right elevational view of the unloader of FIG. 1 showing a sensor arrangement in accordance with the present disclosure. In this view, the unloader is shown hitched to a tractor.
Figure 5:
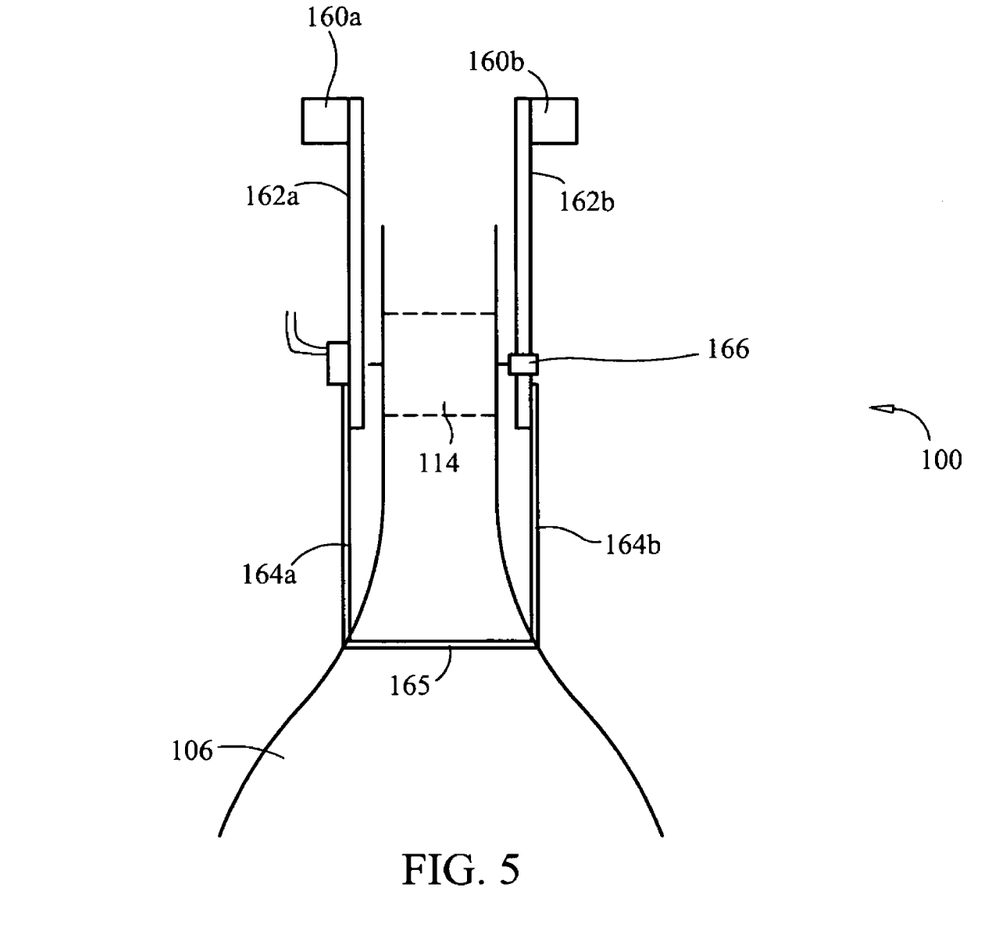
FIG. 5 is a fragmentary, top plan view of a roller in accordance with the present disclosure.

As can be gleaned from FIG. 4, the collection auger 120 is positioned above the ground 103 such that it does not directly contact either the ground 103 or the bottom of the storage bag 106. Preferably, the vertical spacing between the auger 120 and the ground 103 can be effectively adjusted by substituting pairs of support wheels 117 having various diameters. One might elect to adjust spacing between the auger 120 and the bottom of the storage bag 106 resting on the ground 103 based upon factors such as: (a) the granularity of material being unloaded from the storage bag 106; or (b) auger height positioning necessary to achieve a desired rate of removal of the material from the storage bag 106. Accordingly, if the unloader 100 is being used to unload a fine grain (e.g., wheat) from a storage bag 106, the auger 120 may need to be positioned closer to the ground 103 than would be the case if silage or another more coarse material were being unloaded therefrom.

As can be seen in FIG. 3, the auger 120 includes a rotating helical blade or flighting 128. In operation, as the auger blade 128 rotates and comes into contact with material contained within the storage bag 106, the blade 128 gathers a quantity of the material and moves it axially along the laterally disposed auger 120—from its outer ends towards a longitudinal centerline CL of the entire collection mechanism 108. In so doing, the gathered material is deposited onto a longitudinally disposed and inclined conveyor mechanism 122 positioned at the lateral center of the auger 120. In the embodiment depicted in FIGS. 2 and 3, the conveyor mechanism 122 is a chain conveyor. However, it will be generally understood by those of ordinary skill in the art that virtually any mechanism capable of cooperating with the auger 120 to transport material out of the storage bag 106 could be used as the conveyor mechanism 122. For examples, a belt conveyor, screw conveyor, elevator or other similar mechanism could be employed. Both the collection auger 120 and the conveyor mechanism 122 components of the collection mechanism 108 can be powered using a hydraulic motor (not shown) that is powered by an external power system, such as the onboard hydraulic system of the tractor 102.

Referring again to FIGS. 1-4, the conveyor mechanism 122 carries the material away from the auger 120 and deposits it into a temporary holding bin 112. The holding bin 112 serves to temporarily retain the material in the course of it being transferred from the collection mechanism 108 to the discharge mechanism 110. In one embodiment, the holding bin 112 is secured to the lateral support member 158 of the frame assembly 104. In another embodiment, the bin 112 is suspended from the frame assembly by cables.

Figure 6:
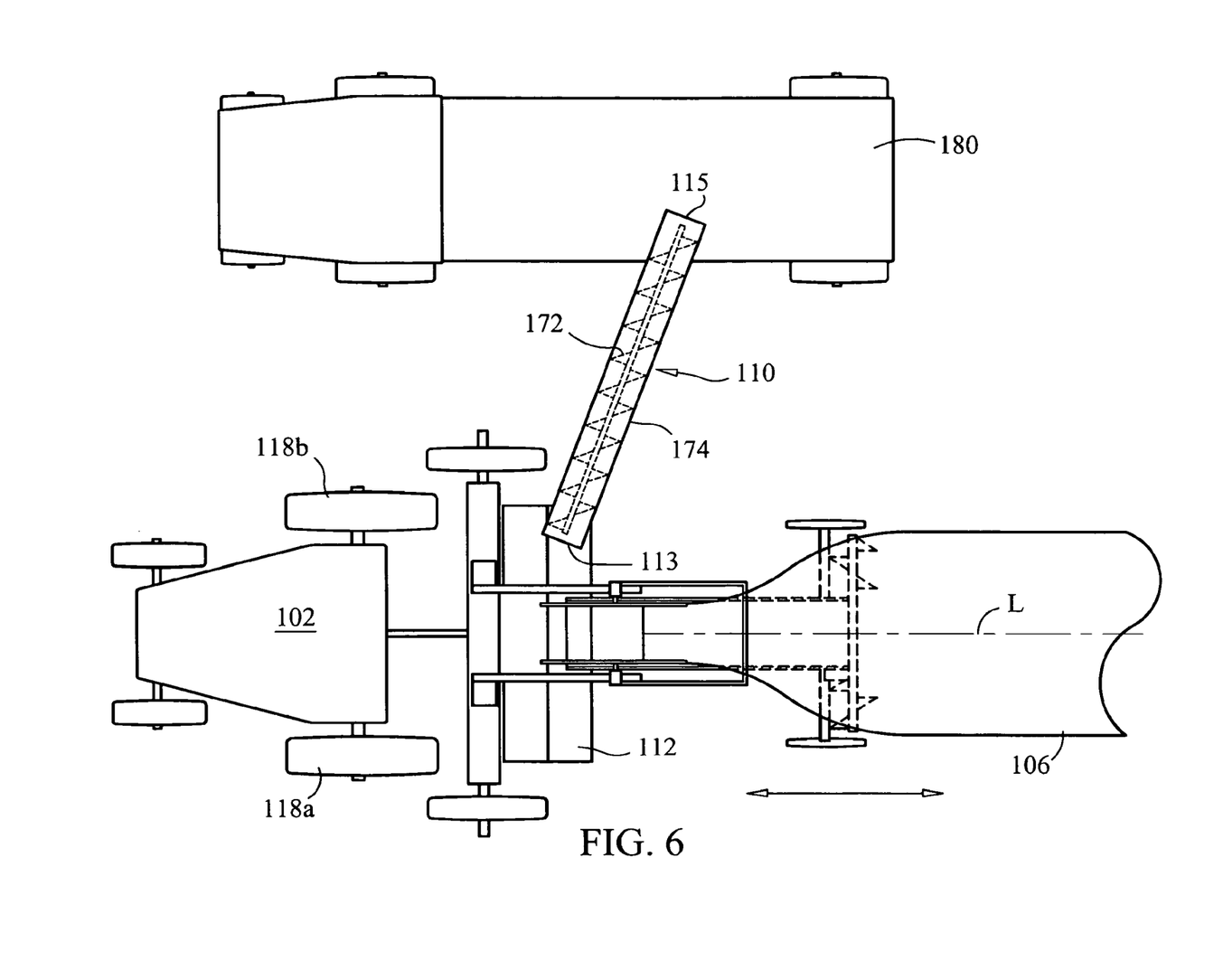
FIG. 6 is a top plan view of the unloader of the FIG. 1 during operation in accordance with the present disclosure.

The discharge mechanism 110 is configured to remove material from the holding bin 112. As shown in FIG. 6, a proximal end 113 of the discharge mechanism 110 is situated within the holding bin 112 while a distal end 115 is extended away from the entire frame assembly 104. Preferably, and as depicted in FIG. 6, the discharge mechanism 110 comprises an auger 172 disposed within a chute 174. As the discharge auger 172 rotates, its proximal end 113 engages material collected in the holding bin 112, and that material is moved toward and then out of the distal end 115 of the chute 174. Of course, while the presently described embodiment contemplates using an auger and chute assembly to move the material, it will be generally understood by those of ordinary skill in the art that any mechanism capable of moving the material in a similar fashion can be used, such as a conveyor, elevator, or other similar mechanisms. The material being unloaded using the unloader 100 is ultimately discharged into another receptacle, such as a trailer 180 (FIG. 6) operating in conjunction with the unloader 100.

Prior to operating the unloader 100, an end of the storage bag 106 should be tied or otherwise fastened to a roller 114 which is part of the frame assembly 104. In the disclosed embodiment, the roller 114 is rotatably secured to the frame assembly 104 at the distal ends of two support arms 162 which are connected, at their respective proximal ends, to two vertical support columns 160. The two vertical support columns 160 extend upwards from and are substantially perpendicular to the lateral support member 158 to which the drive wheels 116 are rotatably connected. As illustrated, the roller 114 is positioned vertically higher than the collection mechanism 108 and the discharge mechanism 110. Therefore, as material is being removed from the storage bag 106, the roller 114 is capable of gradually drawing up and spooling the emptied portion the storage bag 106. A pair of bifurcated guide members 164 that extend rearward from the support arms 162 and the vertical support columns 160, as well as a lateral crossbar 165 that spans between the guide members 164, help to direct the emptied storage bag 106 as it is being drawn toward the roller 114. Also, as seen in FIG. 1, a sharpened cutting blade 119 which juts down from the underside of the conveyor mechanism 122 splits open the bottom of storage bag 106 as it pulled up by the roller 114. This cutting action prevents the storage bag 106 from enveloping the entire conveyor mechanism 122.

The roller 114 can be motor driven. In the embodiment shown in FIG. 2, for example, a hydraulic motor 178 is provided at a support arm 162a. As mentioned above, in the disclosed embodiment, the hydraulic motor 178 is powered by an external power system, such as the onboard hydraulic system of the tractor 102. Additionally, the tension in the storage bag 106 being wound around the roller 114 is monitored, using a pressure regulator 166 attached to the frame assembly 104, in order to control the rotational speed of the roller 114. In particular, as material is unloaded from the storage bag 106, tension in the emptied portion of the bag 106 decreases and causes that bag portion to become slacked or less taut. When this tension falls below a preset level, the pressure regulator 166 activates the roller's hydraulic motor 178, causing the roller 114 to rotate and wind up the slackened bag 106. Then, when tension in the storage bag 106 exceeds the preset level, the pressure regulator 166 deactivates the motor 178 and stops the winding action. In so doing, the roller 114 automatically collects and winds the emptied bag 106 in accordance with the rate at which material is being unloaded therefrom.

The unloader 100 also includes an assembly for sensing material accumulated inside a bag, or "sensor arrangement," attached at the frame assembly 104. As will be described, the sensor arrangement is configured to control the movement of the unloader 100. In this regard, by "control," it is generally meant that the sensor arrangement is configured to provide inputs used for starting and stopping movement of the frame assembly 104 in accordance with the rate at which the collection mechanism 108 is removing material from the storage bag 106 and with the corresponding magnitude of pressure being applied, by the storage bag 106, to the sensor arrangement. Of course, while a sensor arrangement comprising a particular assembly of linkage arms is illustrated herein and described infra, it should be understood that the sensor arrangement could comprise any suitable components that, together, serve as a sensor for: (a) determining engagement with the storage bag 106 and (b) controlling rearward movement of the unloader 100 along the direction D of the storage bag 106 accordingly.

Nevertheless, a first possible embodiment of the sensor arrangement is shown in FIG. 4. As shown, the sensor arrangement comprises a linkage arm 142, an actuator bar 146 and a sensor bar 144. The sensor bar 144 extends between and is pivotably connected to both the linkage arm 142 and actuator bar 146. As shown, the actuator bar 146 extends downward from and is substantially perpendicular to the sensor bar 144. In this orientation, the actuator bar 146 is positioned in contact with the storage bag 106. Additionally, a biasing member 145, such as a spring, elastic strap, or other similar device, is attached between the sensor bar 144 and the frame assembly 104 such that the entire sensor arrangement is biased towards the rear end 107 of the frame assembly 104. In so being, the actuator member 146 remains in continual contact with the storage bag 106 during operation of unloader 100.

The linkage arm 142 component of the sensor arrangement is operatively connected to a hydraulic switch 148 which controls operation of the hydraulic motors 176a, 176b that power the drive wheels 116a, 116b. During operation, once the sensor arrangement travels a predetermined distance towards the rear end 107 of the frame assembly 104, the linkage arm 146 will trigger the hydraulic switch 148. This actuates the hydraulic motors 176a, 176b and powers the drive wheels 116a, 116b, causing the frame assembly 104 to move, along the direction D, towards the storage bag 106. In so moving, the collection mechanism 108 encounters additional material contained within the storage bag 106 that pushes the sensor arrangement back towards the front end 105 of the frame assembly 104. This forward movement of the linkage arm 142 then deactivates the hydraulic switch 148 and causes rearward movement of the frame assembly 104 to slow or stop. Then, as a portion of the storage bag 106 becomes slackened due to material being removed therefrom, the biasing member 145, again, forces the sensor arrangement rearward, and the entire process is repeated. By automatically controlling movement of frame assembly in this manner, the sensor arrangement effectively minimizes the chance of the contents of the storage bag 106 jamming the collection mechanism 108 and eliminates the need for manually controlling advancement of the collection mechanism 108 for the purpose of operating the unloader 100 in a manner that accommodates the dimensions of a particular storage bag or the granularity of a particular type of agricultural material to be unloaded.

While the invention has been particularly shown and described as referenced to the embodiments thereof, those skilled in the art will understand that the foregoing and other changes in form and detail may be made therein without departing from the spirit and scope of the invention.

What is claimed is:

1. An apparatus for automatically unloading material from an elongate storage bag, the apparatus comprising:
   a frame assembly;
   a collection mechanism configured to remove the material from the storage bag;
   a drive mechanism capable of advancing the apparatus along the direction of the storage bag; and
   a sensor arrangement configured to engage the storage bag and to automatically control the drive mechanism according to pressure exerted on the sensor arrangement because of the presence of material within the storage bag, wherein the sensor arrangement comprises:
      an actuator member that is spring-biased;
      a hydraulic switch that actuates the drive mechanism and is operatively manipulated by the actuator member;
      wherein pressure exerted on the actuator member, as the apparatus advances in the direction of the storage bag, causes the actuator member to move against its bias which, in turn, causes the switch to deactivate the drive mechanism and stop advancement of the apparatus; and wherein spring-driven return movement of the actuator member causes the switch to activate the drive mechanism and resume advancement of the apparatus along the direction of the storage bag.

2. The apparatus of claim 1, wherein said apparatus further comprises a roller for spooling the emptying storage bag as said apparatus advances towards a closed end of the storage bag.

3. The apparatus of claim 1, wherein said collection mechanism comprises:
- an auger for collecting the material from within the storage bag;
- a conveyor for receiving and transporting collected material from the auger; and
- a receptacle for receiving collected material from the conveyor.

4. An apparatus for automatically unloading material from an elongate storage bag, the apparatus comprising:
- a frame assembly;
- a collection mechanism configured to remove the material from the storage bag; and
- a drive mechanism capable of advancing the apparatus along the direction of the storage bag;
- a sensor arrangement configured to engage the storage bag and to automatically control the drive mechanism according to pressure exerted on the sensor arrangement because of the presence of material within the storage bag, wherein the sensor arrangement comprises:
- an actuator member;
- a hydraulic switch that actuates said drive mechanism;
- a linkage arm that operatively manipulates the switch, wherein the linkage arm is spring-biased and is disposed operatively between the actuator member and the switch;
- wherein pressure exerted on the actuator member, as said apparatus advances in the direction of the storage bag, causes the actuator member to move and the linkage arm to move against its bias which, in turn, causes the switch to deactivate the drive mechanism and stop advancement of the apparatus; and
- wherein spring-driven return movement of the linkage arm causes the switch to activate the drive mechanism and resume advancement of the apparatus along the direction of the storage bag.

\* \* \* \* \*